US012072920B2

(12) United States Patent
Lee et al.

(10) Patent No.: US 12,072,920 B2
(45) Date of Patent: Aug. 27, 2024

(54) SYSTEM AND METHOD FOR SUMMARIZATION OF SEARCH RESULTS

(71) Applicant: MOTOROLA SOLUTIONS, INC., Chicago, IL (US)

(72) Inventors: Chia Ying Lee, Medford, MA (US); Nikolai Kuznetcov, Vacouver (CA); Mariya Bondareva, Loxahatchee, FL (US); Roger David Donaldson, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 22 days.

(21) Appl. No.: 18/064,405

(22) Filed: Dec. 12, 2022

(65) Prior Publication Data

US 2024/0193199 A1    Jun. 13, 2024

(51) Int. Cl.
*G06F 16/00* (2019.01)
*G06F 16/33* (2019.01)
*G06F 16/34* (2019.01)

(52) U.S. Cl.
CPC ........ *G06F 16/345* (2019.01); *G06F 16/3331* (2019.01)

(58) Field of Classification Search
None
See application file for complete search history.

(56) References Cited

U.S. PATENT DOCUMENTS

| | | | |
|---|---|---|---|
| 8,261,200 B2 | 9/2012 | Denque et al. | |
| 8,990,206 B2 | 3/2015 | Connolly et al. | |
| 9,037,569 B2 | 5/2015 | Wood et al. | |
| 9,092,458 B1* | 7/2015 | Perona | G06F 16/583 |
| 10,169,453 B2 | 1/2019 | Luo et al. | |
| 11,573,971 B1* | 2/2023 | Cannon | G06F 16/252 |
| 2006/0206806 A1 | 9/2006 | Han et al. | |
| 2013/0275418 A1* | 10/2013 | Kumar | G06T 3/40 707/723 |
| 2015/0169725 A1 | 6/2015 | Jing et al. | |
| 2015/0339288 A1 | 11/2015 | Baker et al. | |
| 2015/0370833 A1* | 12/2015 | Fey | G06F 16/532 707/767 |
| 2016/0358632 A1 | 12/2016 | Lakhani et al. | |
| 2021/0279232 A1 | 9/2021 | Kim | |

* cited by examiner

*Primary Examiner* — Bai D Vu

(57) ABSTRACT

Techniques for summarization of search results are provided. A similarity search query comprising at least one search criteria is received. The similarity search query is executed on at least one data source containing a plurality of images associated with metadata responsive to the search criteria. A plurality of search results response to the similarity search query is received from the at least one data source. The plurality of search results is clustered based on the metadata associated with the plurality of search results excluding the similarity criteria. The plurality of search results is summarized based on the results of the clustering. The summarization is displayed in a display view. An interactive user interface is provided to refine the plurality of search results based on the summarization.

17 Claims, 8 Drawing Sheets

SYSTEM AND METHOD FOR SUMMARIZATION OF SEARCH RESULTS

BACKGROUND

Current search engines allow for searching of images and video for targets of interest. Search engines may index such files based on the content of images. For example, a search engine may caption each image by providing a description of what is depicted in the image. For example, a caption of an image of a woman in a blue shirt, black plants, carrying a purse, and walking may be, "woman in a blue shirt and black pants carrying a purse and walking." In some cases, there may be a distinct set of facets that are tracked. For example, clothing color top, clothing color bottom, accessories, action. In such a case, the facets may describe the same image as "Top: Blue; Bottom: Black, Accessories: Purse; Action: Walking."

A person may perform a search for a person by using a search query. For example, a search for "A woman in a blue shirt." Such a search query will search the database and return all records whose captions include a woman wearing a blue shirt. The results may then be ranked based on the confidence level of the selected attributes. For example, search results that clearly show a blue shirt may be ranked higher than those results where the shirt is most likely blue, but could potentially be a different color. Likewise, search results where the person is most likely a woman may be ranked higher than those where it is not as clear.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
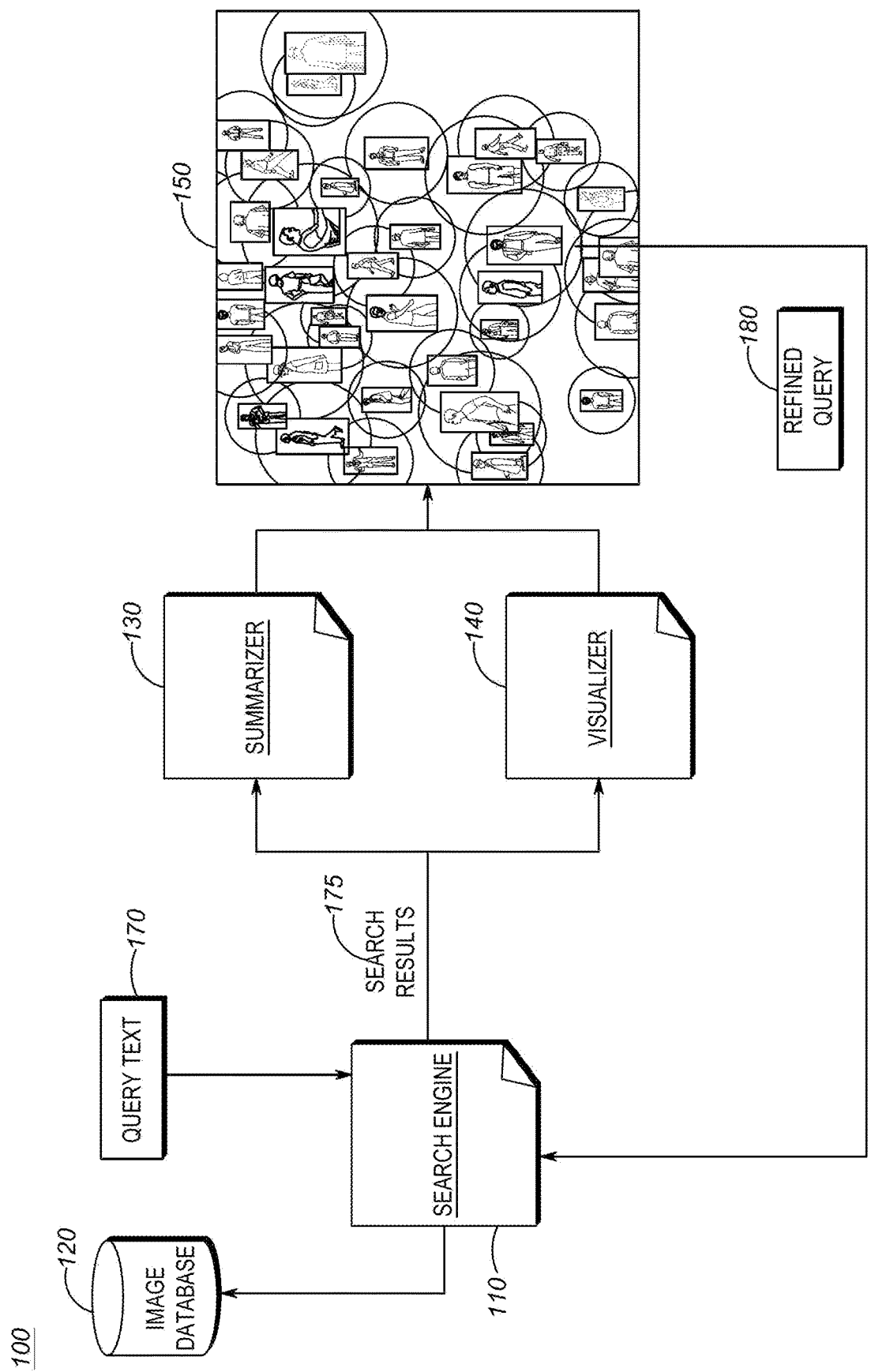
FIG. 1 is an example of a system that may implement the summarization of search results techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the ability to search for results within images and videos stored in a database makes the task of finding items of interest easier than reviewing every single stored item, the ranked search results still may not be presented in an efficient manner. For example, assume there is a large set of images of the same person who satisfies the search criteria of being a woman wearing a blue shirt, with almost 100% confidence. Such search results would tend to be ranked very high. As such, the first results presented on a screen might all be of the same person. If it turns out that is not the person that was being searched for, a user would have to scroll through the list, looking at duplicated results.

Similarly, if there are a large number of results, many false positives may occur. That is to say many of the results may include the features specified in the search criteria, but are not the actual targets of interest of the search. For example, consider the case where the search query was "person wearing jeans" in a location where wearing jeans is by far the most common piece of clothing. Each of these results would need to be reviewed to determine if the target of the search is included. This is a time consuming and tedious process for identifying search results. Manually scrolling through results that match the original query is an inefficient use of time.

The techniques described herein overcome this problem individually and collectively. Once the search results are received, the results are summarized and conveyed to the user to give the user an overview of the contents of the search results. Particular features of the search results, that were not specified in the search query, can be identified. The user may then refine the search query based on these identified features.

For example, the search query, "A woman in a blue shirt" may return a large number of results. A search summarizer may scan through these results to identify distinctive features while ignoring common features. For example, if the majority of the results include women wearing jeans, further refinement based on jeans would not be efficient. If the search results indicate that the results show distinctive features (e.g. 4 distinct types of footwear—sneakers, sandals, high heels, and rain boots), the search results can be organized based on this distinctive feature, even though it was not part of the initial search query.

If the user is able to specify what type of footwear is being worn by the target of interest (e.g. wearing sandals, etc.), the initial search may be refined based on this information (e.g. a woman wearing a blue shirt and wearing sandals, etc.). If the user is not able to use the further refinement (e.g. does not know the type of footwear), the process may be repeated with another distinctive feature.

A method to summarize search results from a similarity search request is provided. The method includes receiving a similarity search query from a user, the similarity search query comprising at least one similarity search criteria. The method also includes executing the similarity search query on at least one data source, the at least one data source comprising a plurality of images, each of the plurality of images associated with metadata responsive to the similarity search criteria. The method also includes receiving a plurality of search results from the at least one data source, the plurality of search results including a plurality of images from the data source, the plurality of images responsive to the at least one similarity search criteria. The method also includes clustering the plurality of search results, the clustering based on the metadata associated with the plurality of search results excluding the at least one similarity search criteria. The method also includes summarizing the plurality of search results based on the clustering, the summarization based on at least one of dominant subsets of the plurality of search results, feature categories of the plurality of search results, and distinctive features of the plurality of search results. The method also includes displaying the summarization of the plurality of search results in a display view. The method also includes providing an interactive user interface to allow the user to refine the plurality of search results based on the summarization.

In one aspect of the method, the clustering is performed using a k-means clustering algorithm. In one aspect of the method, the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

In one aspect of the method the display view is a similarity embedding view and the interactive user interface further comprises receiving, from the user, an area selection of the similarity embedding view, refining the search query based on the area selection, and submitting the refined query for a subsequent search. In one aspect of the method the display view is a cluster view and the interactive user interface further comprises receiving, from the user, a cluster selection of the cluster view, refining the search query based on the cluster selection, and submitting the refined query for a subsequent search.

In one aspect of the method the display view is a tree view and the interactive user interface further comprises receiving, from the user, a node selection of the tree view, refining the search query based on the node selection, and submitting the refined query for a subsequent search. In one aspect of the method the interactive user interface further comprises a search assistant chatbot, wherein the search assistant chatbot prompts the user with search refinement options, the search refinement options based on the summarization of the plurality of search results.

A system to summarize search results from a similarity search request is provided. The system includes a processor and a memory coupled to the processor. The memory includes a set of instructions thereon that when executed by the processor cause the processor to receive a similarity search query from a user, the similarity search query comprising at least one similarity search criteria. The instructions also cause the processor to execute the similarity search query on at least one data source, the at least one data source comprising a plurality of images, each of the plurality of images associated with metadata responsive to the similarity search criteria. The instructions also cause the processor to receive a plurality of search results from the at least one data source, the plurality of search results including a plurality of images from the data source, the plurality of images responsive to the at least one similarity search criteria. The instructions also cause the processor to cluster the plurality of search results, the clustering based on the metadata associated with the plurality of search results excluding the at least one similarity search criteria. The instructions also cause the processor to summarize the plurality of search results based on the clustering, the summarization based on at least one of dominant subsets of the plurality of search results, feature categories of the plurality of search results, and distinctive features of the plurality of search results. The instructions also cause the processor to display the summarization of the plurality of search results in a display view. The instructions also cause the processor to provide an interactive user interface to allow the user to refine the plurality of search results based on the summarization.

In one aspect the instructions to cluster the plurality of search results is a k-means clustering algorithm. In one aspect, the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

In one aspect of the system the display view is a similarity embedding view and the interactive user interface further comprises instructions to receive, from the user, an area selection of the similarity embedding view, refine the search query based on the area selection, and submit the refined query for a subsequent search. In one aspect of the system the display view is a cluster view and the interactive user interface further comprises instructions to receive, from the user, a cluster selection of the cluster view, refine the search query based on the cluster selection, and submit the refined query for a subsequent search.

In one aspect of the system the display view is a tree view and the interactive user interface further comprises instructions to receive, from the user, a node selection of the tree view, refine the search query based on the node selection, and submit the refined query for a subsequent search. In one aspect of the system the interactive user interface further comprises instructions to implement a search assistant chatbot, wherein the search assistant chatbot prompts the user with search refinement options, the search refinement options based on the summarization of the plurality of search results.

A non-transitory processor readable medium comprising a set of instructions thereon to summarize search results from a similarity search request is provided. The instructions that when executed by a processor cause the processor to receive a similarity search query from a user, the similarity search query comprising at least one similarity search criteria. The instructions on the medium also cause the processor to execute the similarity search query on at least one data source, the at least one data source comprising a plurality of images, each of the plurality of images associated with metadata responsive to the similarity search criteria. The instructions on the medium also cause the processor to receive a plurality of search results from the at least one data source, the plurality of search results including a plurality of images from the data source, the plurality of images responsive to the at least one similarity search criteria. The instructions on the medium also cause the processor to cluster the plurality of search results, the clustering based on the metadata associated with the plurality of search results excluding the at least one similarity search criteria. The instructions on the medium also cause the processor to summarize the plurality of search results based on the clustering, the summarization based on at least one of dominant subsets of the plurality of search results, feature categories of the plurality of search results, and distinctive features of the plurality of search results. The instructions on the medium also cause the processor to display the summarization of the plurality of search results in a display view. The instructions on the medium also cause the processor to provide an interactive user interface to allow the user to refine the plurality of search results based on the summarization.

In one aspect of the medium the instructions to cluster the plurality of search results is a k-means clustering algorithm. In one aspect of the medium the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

In one aspect of the medium the display view is a similarity embedding view and the interactive user interface further comprises instructions to receive, from the user, an area selection of the similarity embedding view, refine the search query based on the area selection, and submit the refined query for a subsequent search. In one aspect of the medium the display view is a cluster view and the interactive user interface further comprises instructions to receive, from the user, a cluster selection of the cluster view, refine the search query based on the cluster selection, and submit the refined query for a subsequent search.

In one aspect of the medium the display view is a tree view and the interactive user interface further comprises instructions to receive, from the user, a node selection of the tree view, refine the search query based on the node selection, and submit the refined query for a subsequent search.

Further advantages and features consistent with this disclosure will be set forth in the following detailed description, with reference to the figures.

FIG. 1 is an example of a system 100 that may implement the summarization of search results techniques described herein. The system described with respect to FIG. 1 may be implemented by a device, such as the device described below with respect to FIG. 8. What should be understood is that each of the pieces of functionality described with respect to FIG. 1 may be implemented on one or more hardware devices which include a processor, memory, display units, etc.

System 100 may include a search engine 110. The search engine 110 may utilize any currently known or later developed search algorithms to search a database 120 for images of interest. For purposes of the remainder of this description, searches will be described in terms of images of interest, however it should be understood that the techniques are equally applicable to other forms of media, including video. If the search item can be described via a caption, the techniques described could be equally applied. It should be further understood that the search query, which can also be referred to as a similarity search query or similarity search request, can be executed by a search engine external to system 100. That is to say the actual search execution may be performed by an external service, with the search results summarized and visualized, as described below, by the system 100.

Image database 120 may store media, such as images. Image database 120 is not intended to imply a single monolithic data store, but rather is intended to describe a logical database. The database 120 may be a distributed database consisting of multiple nodes, completely disparate data storage systems, public data stores, private data stores, etc. What should be understood is that database 120 is intended to describe any source of media that can be accessed by search engine 110, regardless of the specific implementation of the database. In other words, image database 120 is intended to represent any system from which search engine 110 is able to retrieve results.

Summarizer 130 may provide summarization of the search results via clustering and distinctive entity mining of image captions. The summarizer provides insights into the contents of the search results that were not necessarily present in the original search query. These insights may be useful to help the submitter of the search query in refining their search in order to retrieve images of the target of interest.

The summarizer 130 may operate by identifying salient information about the search results as a whole. For example, dominant subsets of features in the search results may be identified. For example, if a search for "woman in blue shirt" was performed, the results would generally all include people captioned as women who are indicated as wearing blue shirts. The summarizer 130 may determine that the majority of the results also are captioned indicating that the person is also wearing blue jeans. Dominant features of the search results may not always be useful when refining search queries. For example, refining the query to include "women in blue shirt wearing jeans" would not necessarily significantly reduce the number of search results, as the majority of search results included that feature.

However, in some cases, the identification of a dominant subset may be helpful. For example, if it is later determined that the target individual (e.g. woman in a blue shirt) is not wearing jeans, refining the search query to "women wearing blue shirt and not wearing jeans" could result in a significantly smaller set of search results, as the results including people wearing jeans could be eliminated.

As yet another example, the summarizer 130 may identify features in the search results with the largest differences and variance across the search results. For example, assume the search results for "woman in a blue shirt" returns results that indicate there are a large number of different types of footwear in the results. For example, the search results may indicate that the targets wear sneakers, sandals, high heels, and rain boots. Further refinement of the search query based on these differences may allow irrelevant search results to be eliminated.

As yet another example, the summarizer 130 may identify distinctive features of the search results that make them stand out from other search results. For example, search results where the target has certain accessories (e.g. wearing earrings, nose ring, tie, etc.), is carrying something (e.g. a backpack, purse, etc.), distinctive clothing (e.g. rainbow colored pants, etc.). As will be described below, the summarization may be presented to the user in a format that assists the user in refining the search query.

The summarizer 130 may provide this functionality using any number of clustering algorithms to identify the common and distinctive features, including those with the largest differences and variances in the search results. One such technique that is currently available is K-Means clustering. However, it should be understood that the techniques described herein are not so limited. Other clustering algorithms may include Affinity propagation, Mean-shift, Spectral clustering, ward hierarchical clustering, agglomerative clustering, DBSCAN, OPTICS, Gaussian mixtures, BIRCH, Bisecting K-Means, etc. What should be understood is that any clustering algorithm that may be used to find the common and distinctive features of the search results, either currently available or later developed, are suitable for use with the techniques described herein.

The system 100 may also include a visualizer 140. The visualizer 140 may take the summarized search results and present them to the user in a visual and/or interactive manner to assist the user in refining their search. As will be described in further detail below with respect to FIG. 2-4, a similarity embedding view, a cluster view, and a tree view may be provided on an interactive display 150. The user may interact with the interactive display 150 in order to further refine their search to more readily identify the actual targets of interest for the search.

In operation, query text 170 may be received from a user. Query text may include features of a target to be searched for in the image database 120. Although the description thus far has been in terms of a human search subject (e.g. woman in a blue shirt) it should be understood that the target of the search could be anything. For example, "red four door sedan," "house painted white," etc. The techniques described herein are not limited to any particular type of search target.

The search engine 110 may then execute the search query 170 against the image database 120 to produce a set of search results 175. The search results may then be sent to the summarizer 130 and the visualizer 140.

The summarizer 130 may use a clustering algorithm to identify dominant features as well as distinctive features within the search results. It should be noted that the summarizer 130 may also take into account the particular type of object that is being searched for and limit the identified features to those which are aligned with an ontology consistent with the search query. For example, a search for a woman in a blue shirt" may retrieve a result captioned "woman in a blue shirt standing next to a red four door sedan." The concepts of "four doors" and "sedan" do not fit an ontology associated with a search for a woman, as those features are not associated with humans. As such, the summarizer 130 would not identify such a feature as distinctive or dominant, as the main query relates to humans. On the other hand, if the search query was for "woman in a blue shirt standing next to a car" such features might be used in the summarization, as the initial query did involve elements that would be associated with a vehicle.

The visualizer 140 may then present the search results, as summarized by the summarizer 130 via an interactive display 150, which will be described in further detail below. The user, using the interactive display 150 may provide a refined search 180. The actual selection of the refined search will be described in further detail below and is dependent on the particular visualization being used. The refined search may then be sent back to the search engine 110 and the entire process repeated.

Although the description above has been in terms of search results that include captions, it should be understood that this was for ease of description only. In some implementations, the images themselves may be processed via a neural network to produce an image signature, which may also be referred to as a feature vector. The summarization and visualization may then be performed on those image signatures. In a similar fashion, the caption itself may be processed by a sentence-encoder to again produce a vector on which the summarization and visualization operations are performed. What should be understood is that the vector would have captured the distinctive feature information, albeit in a format that would not be easily understandable by a human. The techniques described herein work equally as well when using vector implementations. As yet another possible implementation, the image caption may include a defined set of facets. For example, for a person, a set of facets could include hair color, upper body clothing color, lower body clothing color, etc. The summarizer and visualizer could then operate on these pre-defined facets.

Figure 2:
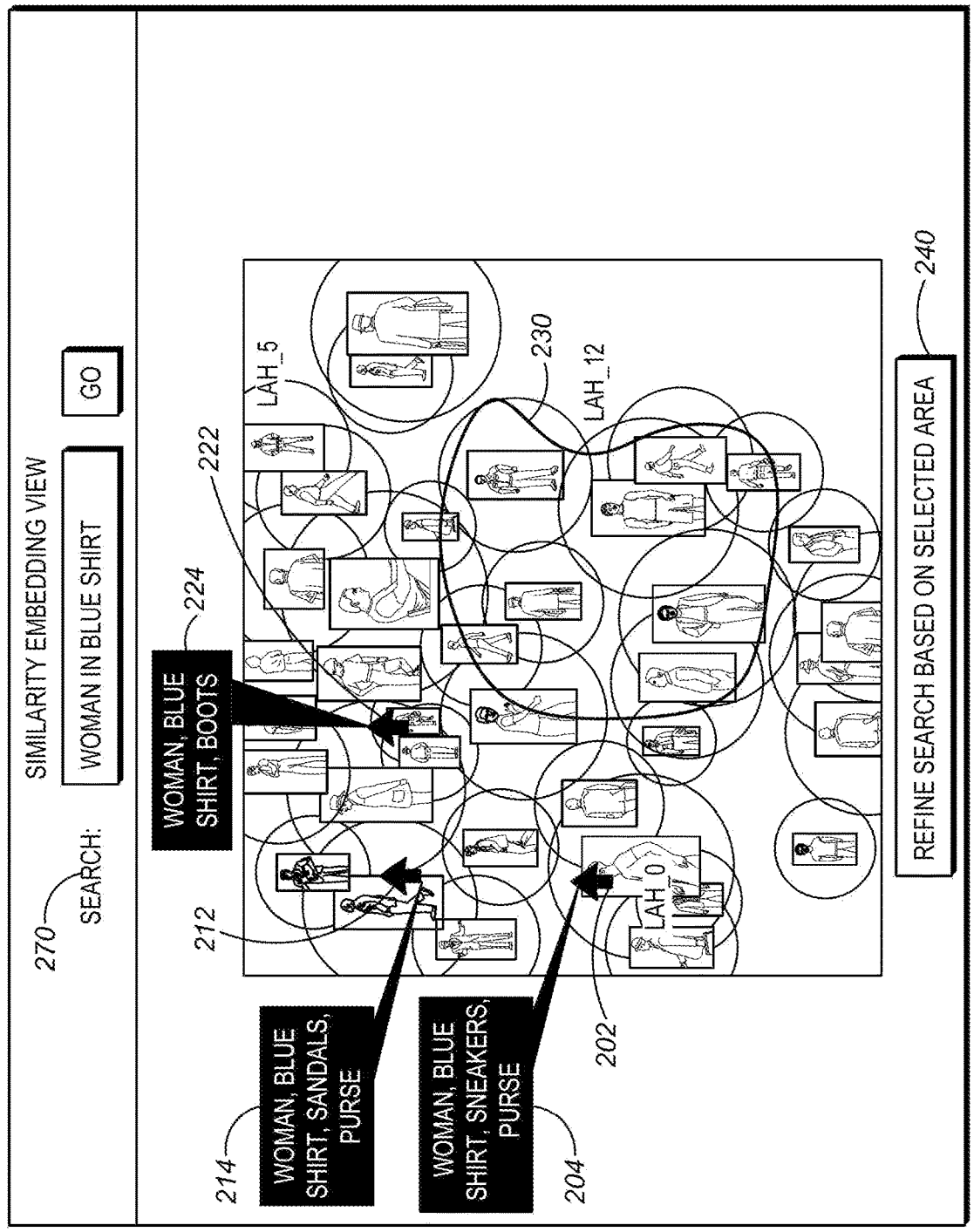
FIG. 2 is an example of a similarity embedding view that may be utilized in accordance with the techniques described herein.

FIG. 2 is an example of a similarity embedding view 200 that may be utilized in accordance with the techniques described herein. For example, the similarity embedding view 200 may be displayed by the visualizer 140 on the interactive display 150. For the sake of completeness, in the view depicted in FIGS. 2-5, the search query 270 (e.g. woman in blue shirt) is shown as being integrated with the view. However, it should be understood that this is for the sake of ease of description, and not by way of limitation.

In the similarity embedding view, the search results are displayed as data points according to their similarities with one another. As explained above, the similarities can be calculated using any number of techniques, but for ease of description, similarities based on image caption are described. In the visualization 200, group structure becomes relatively apparent with images that have similar traits appearing closer together, while those that have dissimilar traits appear further apart.

Shown in FIG. 2 are example search results for "woman in blue shirt" that may have been returned by a search engine. The visualizer may render the results on the interactive display based on similar features. At the outset, it should be understood that all results would be of women in blue shirts, as meeting these criteria is a necessary condition for being included in the search results in the first place.

The user may move their input device (e.g. mouse, touch input, etc.) to a location on the screen, such as location 202. This may cause an information box, such as information box 204 to appear on the interactive display to indicate the features presented in the general location 202. As shown, the features include woman and blue shirt, as would be expected as this was the initial search criteria. However, the features also include footwear (sneakers) and accessories (purse).

The user may then move his mouse to nearby location 212, which may cause information box 214 to pop up. As expected, information box 214 includes woman and blue shirt. In addition, information box 214 indicates that particular results include that the person is carrying a purse, similar to location 202, but is different in that the person is wearing sandals instead of sneakers. Because the features at these two locations are somewhat similar, the results are placed at nearby locations on the interactive display.

In contrast, the user may move the pointing device to location 222 causing information box 224 to pop up. As expected the woman and blue shirt features are present. However, there are no other commonalities with locations 202 and 212. As such, the location 222 is shown further away from locations 202 and 212.

It should be noted that there are no defined borders of where search results are visualized in the similarity embedding view 200. Instead, visualization techniques that provide low dimensionality are utilized. One such example is t-distributed stochastic neighbor embedding (t-SNE) which may be used to reduce high dimensionality data (e.g. all the possible search result features—purse, foot wear, etc.) into a lower dimensionality space that can be visualized in a two or three dimensional display that is more readily understood by a human. Although t-SNE is one possible algorithm, others may include Principal Component Analysis (PCA), Uniform Manifold Approximation and Projection (UMAP), Large Scale Dimensionality Reduction Using Triplets (TriMAP), Pairwise Controlled Manifold Approximation (PacMAP), etc.

The user may then select an area of the similarity embedding view 200 to perform a refined search. In one example implementation, the user may zoom into the area that includes features of interest. For example, if the user would like to focus results on women in a blue shirt carrying a purse, they may zoom into the area including locations 202 and 212, which both include features of carrying a purse. In another implementation, the user may use a selection device (e.g. mouse, touch screen, etc.) to select an area 230 that includes the features that the user desires to see more of. The user may then select control 240 to refine the search based on the features in the area zoomed/selected.

Figure 3:
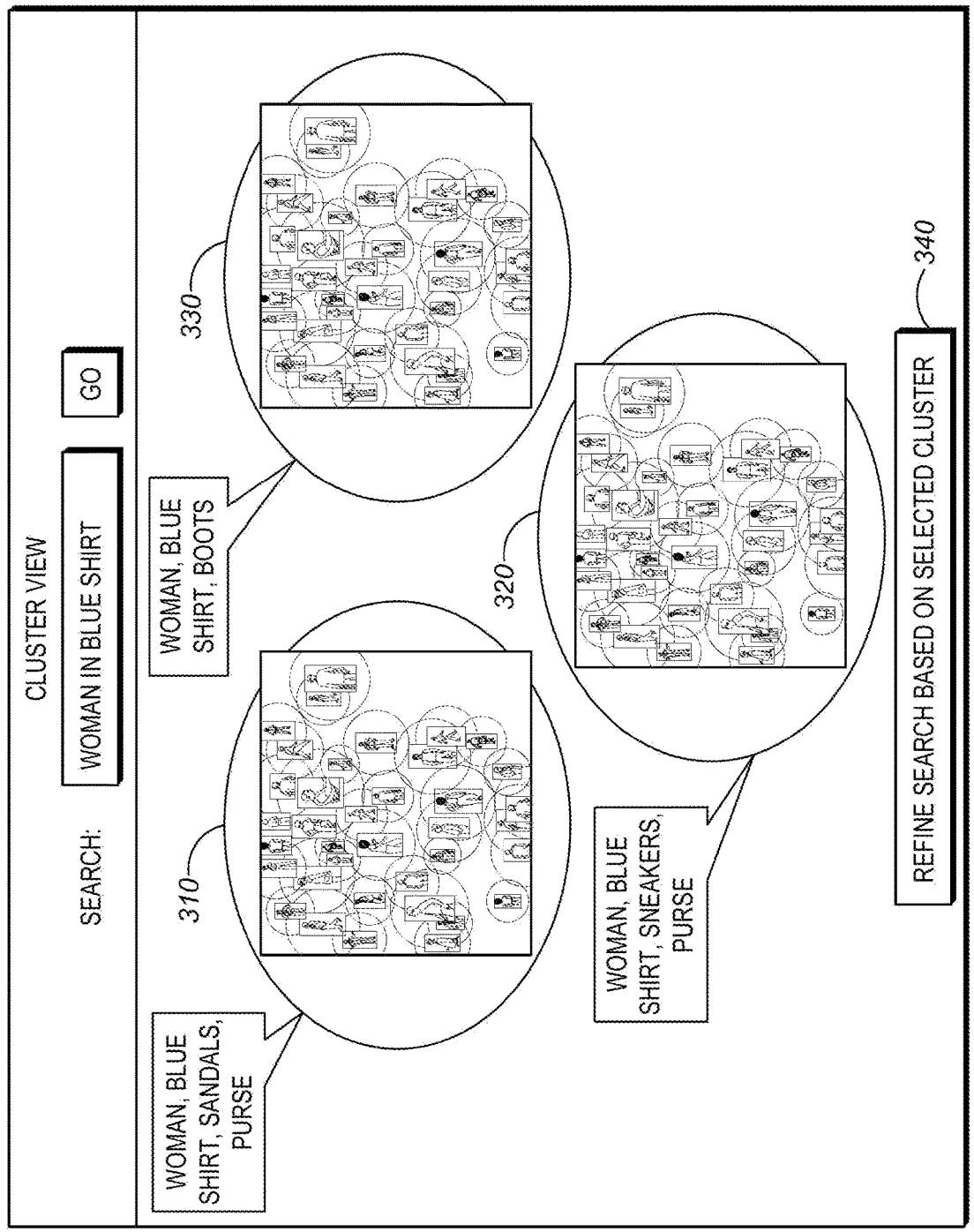
FIG. 3 is an example of a cluster view that may be utilized in accordance with the techniques described herein.

FIG. 3 is an example of a cluster view 300 that may be utilized in accordance with the techniques described herein. The cluster view 300 is a bit more structured than the similarity embedding view 200. In the cluster view 300, each search result is assigned to one and only one cluster, and all search results within the cluster include at least the features that define the cluster. For example, as shown in FIG. 3, cluster 310 includes results that show a woman in a blue shirt wearing sandals and carrying a purse. All results within that cluster will include at least those features. They may include additional features as well, but they will include at least those features.

Cluster 320 may include women in blue shirts carrying a purse, but wearing sneakers. Cluster 330 may include women wearing blue shirts and wearing boots. As should be clear, the distinctive feature in this particular example is the type of footwear that is being worn. Although not shown, the total number of clusters presented may be configured/ selected by the user. For example, after viewing the results, the user may decide that the results were segmented into too many clusters (3) and would like the results to be segmented into two clusters. Given the present example, clustering the results based on if the woman was carrying a purse would result in two clusters (e.g. clusters 310 and 320 might be merged). If the user desires a greater number of clusters, the clustering algorithm could identify features in the search results that cause more clusters to be generated.

Just as above, the user may then select a cluster and activate a control 340 to refine the search based on the selected cluster. The search may then be processed again, using the features identified in the selected cluster. For example, if cluster 330 were selected, the refined search may be, "woman wearing a blue shirt and wearing boots."

Figure 4:
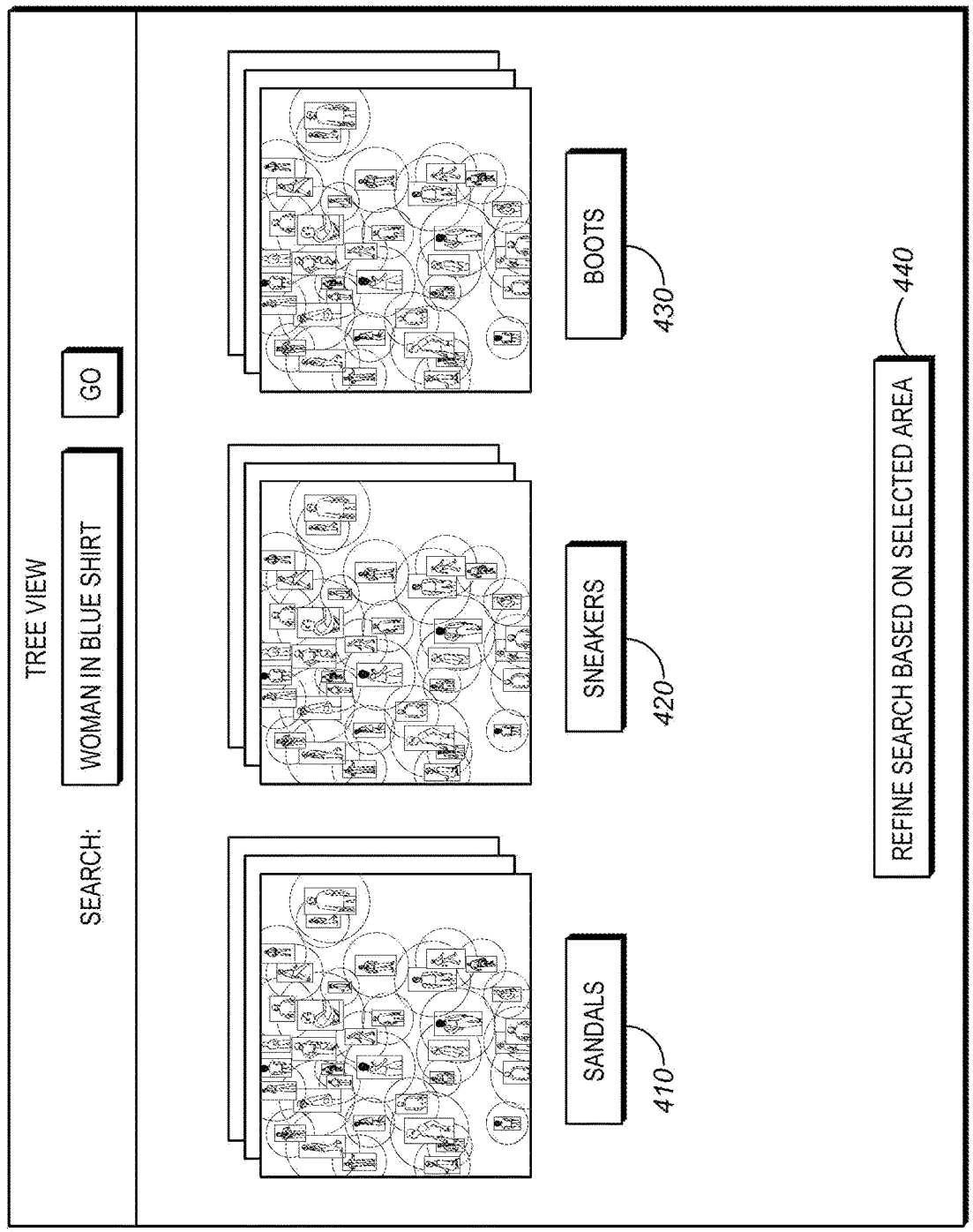
FIG. 4 is an example of a tree view that may be utilized in accordance with the techniques described herein.

FIG. 4 is an example of a tree view 400 that may be utilized in accordance with the techniques described herein. The tree view may be most efficient when it is determined that the search results are dominated by a few features. In the present example, the feature that dominates is the type of footwear. In this example, there are three types of footwear that are present, sandals 410, sneakers 420, and boots 430. As should be understood, all of the results include women in blue shirts. The clustering algorithm may have determined that footwear is a distinctive feature that allows the search results to be efficiently (e.g. similar number of results in each tree node) organized.

Just as above, the user may be given the option to fine tune the number of clusters created. For example, the user may desire more clusters or fewer clusters. If such a selection is made, the clustering algorithm may re-cluster the results to comply with the user's desire. Just as with the cluster view, the user may select one of the tree nodes and activate a control 440 to refine the search based on the selected cluster. For example, if the user selects cluster 420, the refined search may be "woman in a blue shirt wearing sneakers." This refined search may be sent to the search engine to execute against the database.

Figure 5:
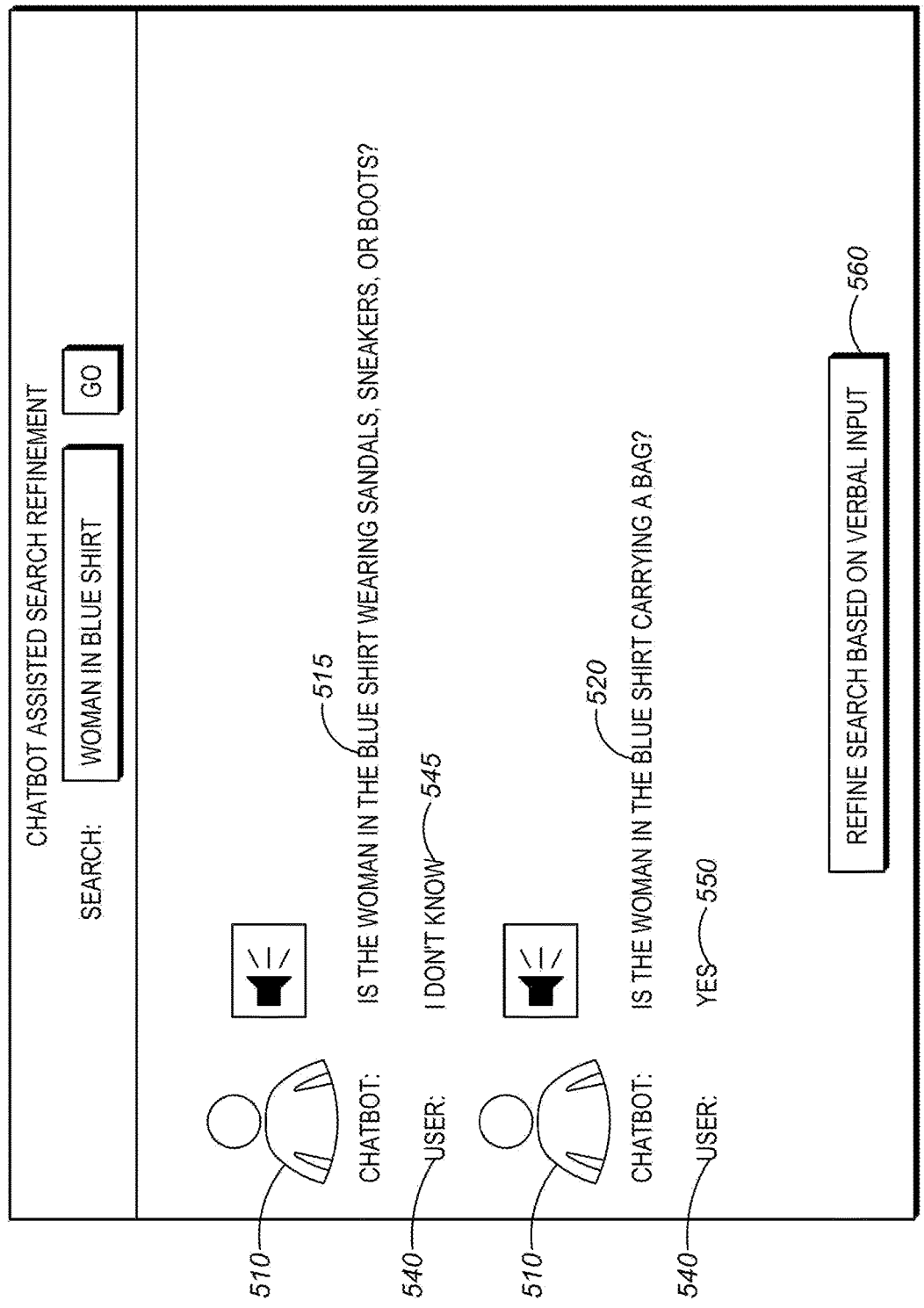
FIG. 5 is an example of chatbot assisted search refinement in accordance with the techniques described herein.

FIG. 5 is an example of chatbot assisted search refinement 500 in accordance with the techniques described herein. In the examples described with respect to FIG. 2-4, it is relatively easy for the user to select the criteria for a refined search, assuming they have a large visual display with easy to use selection devices (e.g. mouse, etc.). However, in today's mobile first environment, the user may be using a device with a limited screen size and relatively imprecise selection (e.g. touch, etc.) input.

The chatbot assisted search refinement interface 500 provides for a voice interface for a user to utilize when their device is limited in terms of display and input selection. The system may identify a feature that may be utilized to distinguish the set of search results. For example, in the example presented with respect to FIG. 4, the system clustered the search results based on three types of footwear (e.g. sandals, sneakers, and boots).

A chatbot 510 may use the identified features to audibly query the user about the distinctive features. For example, the chatbot 510 may ask 515 the user "Is the woman in the blue shirt wearing sandals, sneakers, or boots?" The user may respond by indicating (not shown) if the woman is wearing one of those types of footwear. The search may then be refined based on the selection. This process may be repeated until the number of search results is reduced to a point where it is easier for the user to utilize on his display limited device.

The user 540 may respond 545 that they do not know what type of footwear the woman in the blue shirt was wearing. The system may then re-cluster the search results to determine the next most likely feature that might distinguish the search results. In the present example, the system may determine that carrying a bag is a distinctive feature and ask 520 the user "Is the woman in the blue shirt carrying a bag?" If the user 540 answers yes 550, the search may be refined 560 based on the input.

Although the chatbot 510 has been described in terms of providing audible output to the user and accepting audible input from the user 540, this was for ease of description only. The same questions/response could be provided via a textual interface or any combination of an audible/textual interface. What should be understood is that the chatbot assisted search refinement 500 may be utilized when the user device has limited user interface capabilities.

Figure 6:
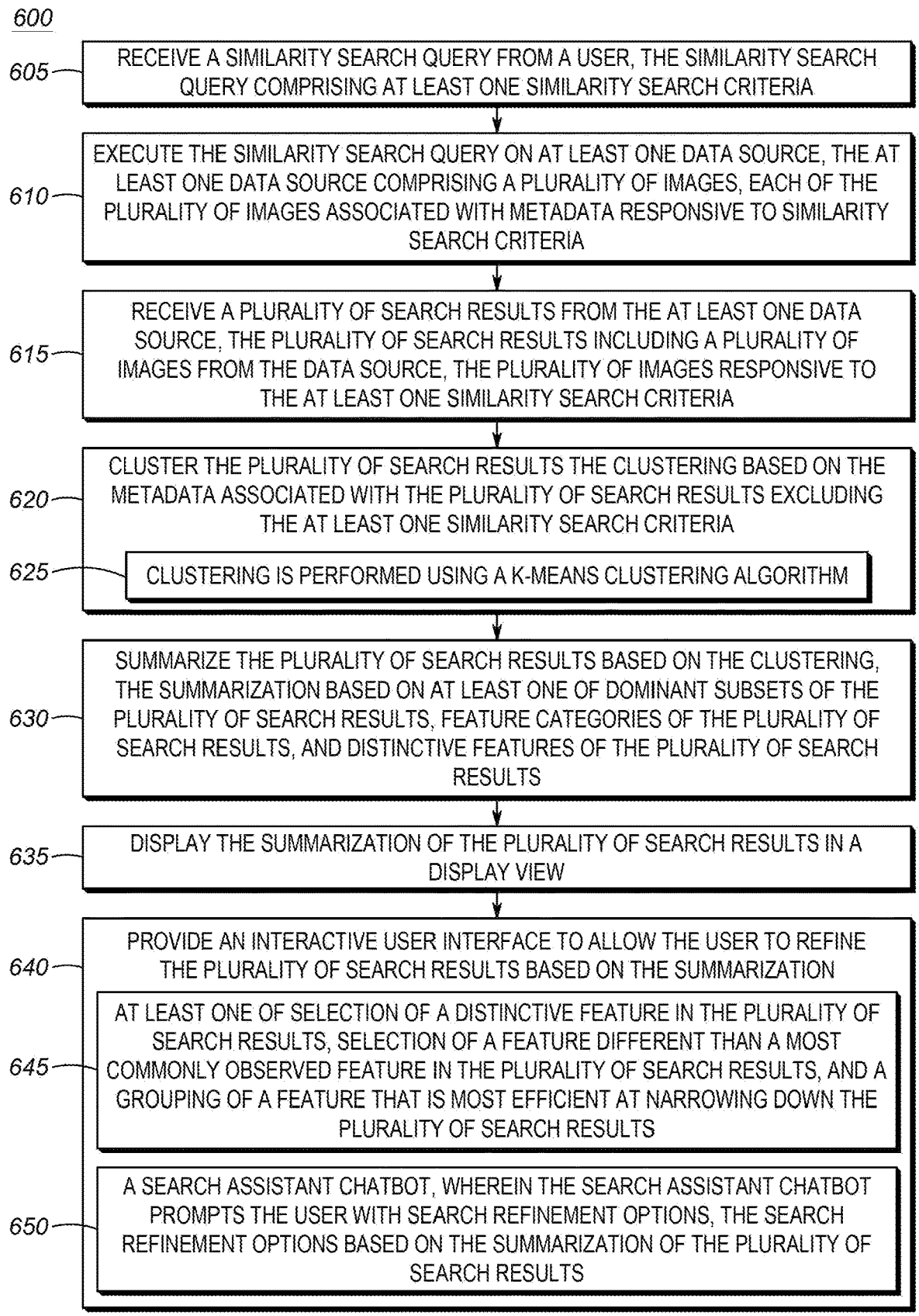
FIG. 6 is an example of a high level flow diagram of an implementation of the summarization of search results techniques described herein.

FIG. 6 is an example of a high level flow diagram 600 of an implementation of the summarization of search results techniques described herein. In block 605, a similarity search query may be received from a user. The similarity search query may comprise at least one similarity search criteria. A similarity search query is a search request from a user to identify images that contain features specified by the user. In the preceding examples, the search query, "woman in a blue shirt" is a similarity search query that is requesting images that meet the at least one search criteria. In this example, the search criteria are that the image includes a woman and that the woman is wearing a blue shirt. It should be understood that the similarity search query need not be for humans, but instead can be for any type of image.

In block 610, the similarity search query may be executed on at least one data source comprising a plurality of images. Each of the plurality of images associated with metadata responsive to the similarity search criteria. The data source need not be a monolithic data source and could be distributed amongst many different systems. What should be understood is that the search is executed against at least one data source that includes a plurality of images.

Each of the images in the data sources may include metadata associated with the image. For example, the metadata could include a human understandable caption for the image (e.g. "A woman in a blue shirt wearing sandals and carrying a purse"). The metadata may include a vector representation of the image or of the image caption. What should be understood is that the metadata associated with each image of the plurality of images is used by the search engine to determine if the image satisfies the similarity search criteria.

In block 615, a plurality of search results may be received from the at least one data source. The plurality of search results may include a plurality of images from the data source, the plurality of images responsive to the at least one similarity search criteria. In other words, the search results may include all images that satisfy the search criteria specified in the similarity search criteria. In the present example, the search results may include all images that include a woman wearing a blue shirt.

In block 620, the plurality of search results may be clustered based on the metadata associated with the plurality of search results excluding the at least one similarity search criteria. In other words, a clustering algorithm may be used to cluster the results based on metadata other than the similarity search criteria (e.g. woman, blue shirt). The clustering is not based on the similarity search criteria because it would be expected that all the search results would include the similarity search criteria, otherwise they would not have been returned as part of the search results. Clustering based on other criteria is used to determine dominant or distinctive features within the plurality of search results.

In block 625, the clustering is performed using a K-Means clustering algorithm. Although a specific clustering algorithm is mentioned, it should be understood that the techniques described herein are suitable for use with any currently available or later developed clustering algorithm. In addition, the clustering algorithm may take user preferences into account when determining the number of clusters to create.

In block 630, the plurality of search results may be summarized based on the clustering. The summarization may be based on at least one of dominant subsets of the plurality of search results, feature categories of the plurality of search results, and distinctive features of the plurality of search results. As explained above, clusters may be defined that further refinement of the search provides improved efficiency in finding the targeted image result. For example, if a dominant subset can be removed, the search results may be reduced. Likewise, if the search results can be clustered based on distinct features (e.g. footwear, etc.) it may be easier to eliminate the total number of search results.

In block 635, the summarization of the plurality of search results may be displayed in a display view. Examples of different types of display views have been presented above, and will be further described with respect to FIG. 7.

In block 640, an interactive user interface to allow the user to refine the plurality of search results based on the summarization is provided. Depending on the particular display view being presented (e.g. similarity embedding view, cluster view, tree view, etc.) there may be provided controls to allow the user to select a portion of the displayed results. The selection may then be used to refine the similarity search query.

In block 645, the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results. A distinctive feature in the plurality of search results may allow for a large number of search results to be excluded from the refined search. For example, if the distinctive feature is footwear, selection of such a feature could reduce the overall number of search results.

Likewise, if the search results include a common feature (e.g. almost all results include the woman in a blue shirt wearing jeans) the selection of a feature different than the most common feature (e.g. selection of woman wearing slacks) could be beneficial in removing a most commonly observed feature. A grouping including a feature that is most efficient at narrowing down the search results could include any feature that allows for a large number of search results to be removed.

In block 650, a search assistant chatbot is provided. The search assistant chatbot prompts the user with search refinement options, the search refinement options based on the summarization of the plurality of search results. As explained with respect to FIG. 5, in some cases, the user may be using a device with limited display capabilities. A chatbot that can either audibly or textually interact with the user would provide a more efficient user interface for users who have display limited devices.

Figure 7:
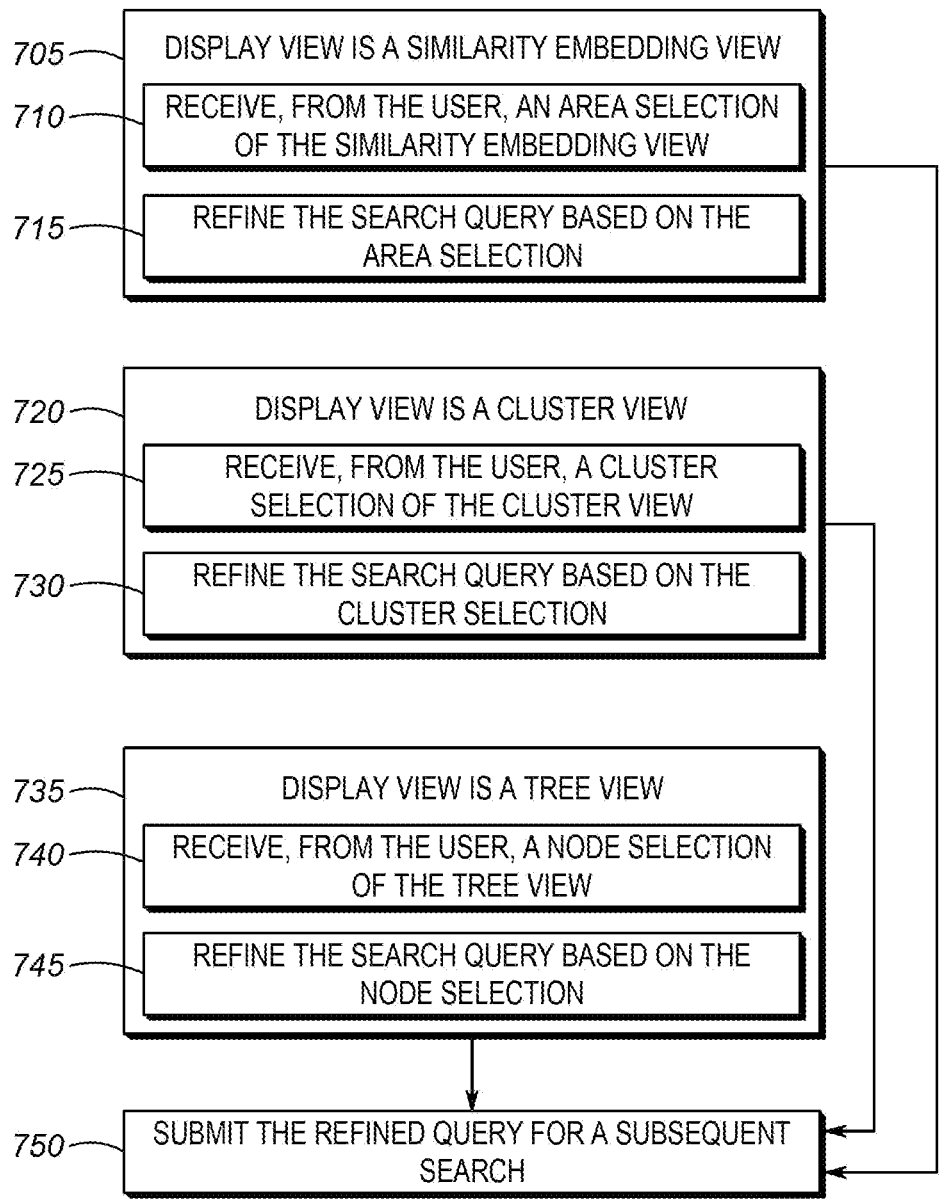
FIG. 7 is an example of a high level flow diagram for refining a search query in accordance with the summarization of search results techniques described herein.

FIG. 7 is an example of a high level flow diagram 700 for refining a search query in accordance with the summarization of search results techniques described herein. In block 705, the display view is a similarity embedding view. A similarity embedding view was described with respect to FIG. 2.

In block 710, the interactive user interface further comprises receiving from the user an area selection of the similarity embedding view. As explained above, the area selection may be a shape drawn by the user on the interactive display that encompasses a region including features that the user is interested in. For example, selection of an area where the search results all exhibit a certain feature (e.g. an area where all search results include a woman carrying a purse, etc.). In a different implementation, the selection of the area may be performed by zooming into a particular portion of the interactive display to an area that includes a feature the user is interested in.

In block 715, the search query may be refined based on the selected area. For example, if the original query was "woman in a blue shirt" and the selected area includes woman carrying a purse, the refined search may be "woman wearing a blue shirt and carrying a purse."

In block 720, the display view is a cluster view. A cluster view was described with respect to FIG. 3. In block 725, the interactive user interface further comprises receiving from the user a cluster selection of the cluster view. As explained above, in the cluster view, search results are grouped into fixed clusters, with each result belonging to only one cluster. The user may select one of the clusters on which to perform a refined search.

In block 730, the search query may be refined based on the selected cluster. For example, if the original query was "woman in a blue shirt" and the selected cluster includes women in blue shirts carrying a purse and wearing sandals, the refined query may be "woman in blue shirt carrying a purse and wearing sandals."

In block 735, the display view is a tree view. A tree view was described with respect to FIG. 4. In block 740, the interactive user interface further comprises receiving from the user a node selection of the tree view. As explained above, in the tree view, the search results are grouped into nodes based on a particular feature. For example, in the description of FIG. 4, the feature was foot wear. Selection of a particular node allows the user to perform a refined search based on the feature of that node.

In block 745, the search query may be refined based on the selected node. For example, if the original query was "woman in a blue shirt" and the selected node includes women in blue shirts wearing sandals, the refined query may be "woman in blue shirt wearing sandals."

In block 750 the refined query may be submitted for a subsequent search. It should be understood that this would result in a new set of search results that would be a subset of the previous search results. The techniques described herein could then be applied again to further reduce the total number of search results. This process could continue to iterate until the total number of search results is sufficiently small that review by the user is not overly burdensome. At the outer limits, the process could be repeated iteratively until only a single search result remains.

Figure 8:
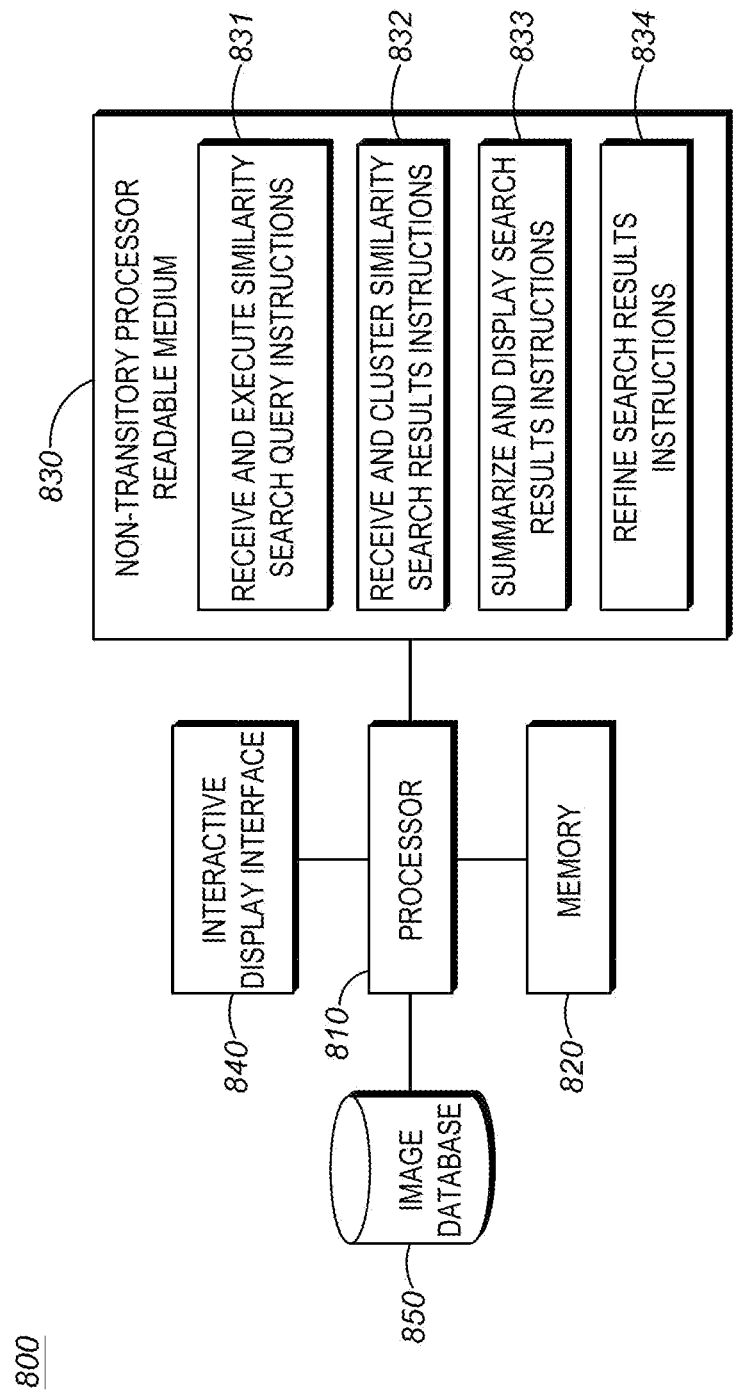
FIG. 8 is an example of a device that may implement the summarization of search results techniques described herein.

FIG. 8 is an example of a device 800 that may implement the summarization of search results techniques described herein. It should be understood that FIG. 8 represents one example implementation of a computing device that utilizes the techniques described herein. Although only a single processor is shown, it would be readily understood that a person of skill in the art would recognize that distributed implementations are also possible. For example, the various pieces of functionality described above (e.g. clustering, dimension reduction, interactive display, etc.) could be implemented on multiple devices that are communicatively coupled. FIG. 8 is not intended to imply that all the functionality described above must be implemented on a single device.

Device 800 may include processor 810, memory 820, non-transitory processor readable medium 830, interactive display interface 840, and image database 850.

Processor 810 may be coupled to memory 820. Memory 820 may store a set of instructions that when executed by processor 810 cause processor 810 to implement the techniques described herein. Processor 810 may cause memory 820 to load a set of processor executable instructions from non-transitory processor readable medium 830. Non-transitory processor readable medium 830 may contain a set of instructions thereon that when executed by processor 810 cause the processor to implement the various techniques described herein.

For example, medium 830 may include receive and execute similarity search query instructions 831. The receive and execute similarity search query instructions 831 may cause the processor to receive a search query including search criteria from a user via the interactive display interface 840. The processor may then execute the similarity search query against an image database 850. The receive and execute similarity search query instructions 831 are described throughout the specification generally, including places such as the description of blocks 605 and 610.

The medium 830 may include receive and cluster similarity search results instructions 832. The receive and cluster similarity search results instructions 832 may cause the processor to receive search results from the image database 850 and cluster the results using a clustering algorithm. The clustering may be performed based on features of the search results. The receive and cluster similarity search results instructions 832 are described throughout the specification generally, including places such as the description of blocks 615-625.

The medium 830 may include summarize and display search results instructions 833. The summarize and display search results instructions 833 may cause the processor to summarize the clustered results and display them via the interactive display view 840 via, for example, a similarity embedding view, a cluster view, and a tree view. The summarize and display search results instructions 833 are described throughout the specification generally, including places such as the description of blocks 630, 635, 705, 720, and 735.

The medium 830 may include refine search results instructions 834. The refine search results instructions 834 may cause the processor to receive input from the user, via the interactive display interface 840, to perform a refined search. Upon receiving the user input the processor may refine the initial search query and perform the search again using the refined search query. This process may be repeated until the overall number of search results is reduced to a manageable number. The refine search results instructions 834 are described throughout the specification generally, including places such as the description of blocks 640-650, 710, 715, 725, 730, and 740-750.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot perform clustering algorithms such as K-Means clustering or dimensionality reduction algorithms, such as t-SNE as it would be beyond that capabilities of the human mind, even when using pen and paper, among other features and functions set forth herein). Furthermore, the techniques described herein improve the search operation of a computer. Finally, the techniques described herein are integrated with a practical application, namely the application of searching for a target image in a database of images.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method to summarize search results from a similarity search request comprising:
   receiving a similarity search query from a user, the similarity search query comprising at least one similarity search criteria;
   executing the similarity search query on at least one data source, the at least one data source comprising a plurality of images, each of the plurality of images associated with metadata responsive to the similarity search criteria;
   receiving a plurality of search results from the at least one data source, the plurality of search results including a plurality of images from the data source, the plurality of images responsive to the at least one similarity search criteria;
   clustering the plurality of search results, the clustering based on the metadata associated with the plurality of search results excluding the at least one similarity search criteria, wherein the clustering is performed using a k-means clustering algorithm;
   summarizing the plurality of search results based on the clustering, the summarization based on at least one of dominant subsets of the plurality of search results, feature categories of the plurality of search results, and distinctive features of the plurality of search results;
   displaying the summarization of the plurality of search results in a display view; and
   providing an interactive user interface to allow the user to refine the plurality of search results based on the summarization.

2. The method of claim 1 wherein the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

3. The method of claim 2 wherein the display view is a similarity embedding view and the interactive user interface further comprises:
   receiving, from the user, an area selection of the similarity embedding view;
   refining the search query based on the area selection; and
   submitting the refined query for a subsequent search.

4. The method of claim 2 wherein the display view is a cluster view and the interactive user interface further comprises:
   receiving, from the user, a cluster selection of the cluster view;
   refining the search query based on the cluster selection; and
   submitting the refined query for a subsequent search.

5. The method of claim 2 wherein the display view is a tree view and the interactive user interface further comprises:
   receiving, from the user, a node selection of the tree view;
   refining the search query based on the node selection; and
   submitting the refined query for a subsequent search.

6. The method of claim 2 wherein the interactive user interface further comprises:
   a search assistant chatbot, wherein the search assistant chatbot prompts the user with search refinement options, the search refinement options based on the summarization of the plurality of search results.

7. A system to summarize search results from a similarity search request comprising:
   a processor; and
   a memory coupled to the processor, the memory containing a set of instructions thereon that when executed by the processor cause the processor to:
      receive a similarity search query from a user, the similarity search query comprising at least one similarity search criteria;
      execute the similarity search query on at least one data source, the at least one data source comprising a plurality of images, each of the plurality of images associated with metadata responsive to the similarity search criteria;
      receive a plurality of search results from the at least one data source, the plurality of search results including a plurality of images from the data source, the plurality of images responsive to the at least one similarity search criteria;
      cluster the plurality of search results, the clustering based on the metadata associated with the plurality of search results excluding the at least one similarity search criteria, wherein the clustering is performed using a k-means clustering algorithm;
      summarize the plurality of search results based on the clustering, the summarization based on at least one of dominant subsets of the plurality of search results, feature categories of the plurality of search results, and distinctive features of the plurality of search results;
      display the summarization of the plurality of search results in a display view; and
      provide an interactive user interface to allow the user to refine the plurality of search results based on the summarization.

8. The system of claim 7 wherein the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

9. The system of claim 8 wherein the display view is a similarity embedding view and the interactive user interface further comprises instructions to:
receive, from the user, an area selection of the similarity embedding view;
refine the search query based on the area selection; and
submit the refined query for a subsequent search.

10. The system of claim 8 wherein the display view is a cluster view and the interactive user interface further comprises instructions to:
receive, from the user, a cluster selection of the cluster view;
refine the search query based on the cluster selection; and
submit the refined query for a subsequent search.

11. The system of claim 8 wherein the display view is a tree view and the interactive user interface further comprises instructions to:
receive, from the user, a node selection of the tree view;
refine the search query based on the node selection; and
submit the refined query for a subsequent search.

12. The system of claim 8 wherein the interactive user interface further comprises instructions to implement:
a search assistant chatbot, wherein the search assistant chatbot prompts the user with search refinement options, the search refinement options based on the summarization of the plurality of search results.

13. A non-transitory processor readable medium comprising a set of instructions thereon to summarize search results from a similarity search request that when executed by a processor cause the processor to:
receive a similarity search query from a user, the similarity search query comprising at least one similarity search criteria;
execute the similarity search query on at least one data source, the at least one data source comprising a plurality of images, each of the plurality of images associated with metadata responsive to the similarity search criteria;
receive a plurality of search results from the at least one data source, the plurality of search results including a plurality of images from the data source, the plurality of images responsive to the at least one similarity search criteria;
cluster the plurality of search results, the clustering based on the metadata associated with the plurality of search results excluding the at least one similarity search criteria, wherein the clustering is performed using a k-means clustering algorithm;
summarize the plurality of search results based on the clustering, the summarization based on at least one of dominant subsets of the plurality of search results, feature categories of the plurality of search results, and distinctive features of the plurality of search results;
display the summarization of the plurality of search results in a display view; and
provide an interactive user interface to allow the user to refine the plurality of search results based on the summarization.

14. The medium of claim 13 wherein the interactive user interface to allow the user to refine the plurality of search results based on the summarization comprises at least one of selection of a distinctive feature in the plurality of search results, selection of a feature different than a most commonly observed feature in the plurality of search results, and a grouping of a feature that is most efficient at narrowing down the plurality of search results.

15. The medium of claim 14 wherein the display view is a similarity embedding view and the interactive user interface further comprises instructions to:
receive, from the user, an area selection of the similarity embedding view;
refine the search query based on the area selection; and
submit the refined query for a subsequent search.

16. The medium of claim 14 wherein the display view is a cluster view and the interactive user interface further comprises instructions to:
receive, from the user, a cluster selection of the cluster view;
refine the search query based on the cluster selection; and
submit the refined query for a subsequent search.

17. The medium of claim 14 wherein the display view is a tree view and the interactive user interface further comprises instructions to:
receive, from the user, a node selection of the tree view;
refine the search query based on the node selection; and
submit the refined query for a subsequent search.

* * * * *